(12) United States Patent
Shramko et al.

(10) Patent No.: US 11,408,785 B2
(45) Date of Patent: Aug. 9, 2022

(54) FORCE SENSOR ASSEMBLY

(71) Applicant: SENSATA TECHNOLOGIES, INC., Attleboro, MA (US)

(72) Inventors: Michael A. Shramko, South Attleboro, MA (US); Shihong Huo, Bedford, MA (US); Sam Black, Somerville, MA (US); Roberto L. Rivera, Cumberland, RI (US); Jianzhuan Lin, West Hartford, MA (US); Eric A. Wolf, Boston, MA (US); Mark Taddonio, Cambridge, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 135 days.

(21) Appl. No.: 16/814,209

(22) Filed: Mar. 10, 2020

(65) Prior Publication Data

US 2021/0285833 A1   Sep. 16, 2021

(51) Int. Cl.
*G01L 1/22* (2006.01)
*B64C 13/04* (2006.01)

(52) U.S. Cl.
CPC ............ *G01L 1/2268* (2013.01); *B64C 13/04* (2013.01)

(58) Field of Classification Search
CPC ...... G01L 1/2268; B64C 13/04; B60W 30/12; A61B 17/29; A61B 17/2909
USPC ................................................... 73/862.627
See application file for complete search history.

(56) References Cited

U.S. PATENT DOCUMENTS

| | | | | |
|---|---|---|---|---|
| 3,693,425 A * | 9/1972 | Starita | ................... | G01L 1/2262 |
| | | | | 73/862.044 |
| 3,921,445 A * | 11/1975 | Hill | .......................... | G01L 1/24 |
| | | | | 73/862.043 |
| 4,448,083 A * | 5/1984 | Hayashi | .................. | G01L 5/162 |
| | | | | 73/862.042 |
| 5,889,214 A * | 3/1999 | Kang | ..................... | G01L 5/1627 |
| | | | | 73/862.044 |
| 7,743,672 B2 * | 6/2010 | Kurtz | ....................... | G01N 3/08 |
| | | | | 73/862.046 |
| 9,724,473 B2 * | 8/2017 | Demas | .................. | G01L 1/2206 |
| 2015/0135856 A1* | 5/2015 | Kim | ....................... | G01L 5/1627 |
| | | | | 73/862.045 |

FOREIGN PATENT DOCUMENTS

GB          2493365      *  6/2013

* cited by examiner

*Primary Examiner* — Octavia Davis Hollington
(74) *Attorney, Agent, or Firm* — Mark H. Williams

(57) ABSTRACT

A force sensor, flexible sensing element, and method for the force sensor are disclosed. The force sensor uses a flexible sense element with two flexible arms dedicated to measuring strain related to a pitch force and two flexible arms dedicated to measuring strain related to roll force. The use of two channels for each measurement provides a command lane and a monitor lane for strain measurements. Strain gauges are disposed on both the top and the bottom surfaces of each arm, thus providing two completely redundant systems. When a failure is detected in one of the systems, the redundant system can be implemented.

12 Claims, 11 Drawing Sheets

FORCE SENSOR ASSEMBLY

BACKGROUND

Inceptors are the controls that pilots use to direct and maneuver an aircraft. Commonly referred to as "sticks," inceptors traditionally are connected to directional aircraft surfaces and power controls through mechanical linkages. On fly-by-wire aircraft, the inceptors transmit pilot inputs to the flight control computer, which translates them instantaneously to commands that adjust directional surfaces and power.

Pilot inputs to the stick may be translated into commands using a variety of mechanical and sensor configurations. For example, position sensors responsive to stick position may generate signals indicative of the pilot's movement of the stick. A force sensor provided on the stick, below the grip, responds to a force applied to the stick and generates signals indicative of the pilot's movements on the grip. If the stick were to become jammed due to a mechanical failure, the force sensor may be relied upon to generate pilot inputs with respect to pitch and roll. Thus, the provision of a force sensor, above any potential jamming point, is advantageous because the force being applied to the stick by a pilot can be detected independently of any positional data generated.

The force sensor typically includes a sense element that is sensitive to the stress and/or strain imposed on the stick. Therefore, the accuracy of the strain measurements produced by the sense element and interpreted by the force sensor is critical for flight safety. Thus, there is a need to monitor strain measurements of the sense element that are relied upon for pilot input so that those measurements can be verified. It is also desirable to provide a failsafe system in the event that the strain measurements cannot be verified.

The sense element generates signals indicative of strain in an "x" direction and a "y" direction corresponding to pitch and roll. Thus, it is desirable to provide a sense element that reduces cross-talk between the pitch and roll channels, and to reduce the measurement of unwanted tangential strain on a flexible arm.

SUMMARY

A force sensor apparatus in accordance with embodiments of the present invention includes a flexible sensing element, a primary sensor system connected to the flexible sensing element, and a redundant sensor system connected to the flexible sensing element. The primary sensor system includes a command "lane" that includes a pitch channel and roll channel producing data indicative of pitch and roll pilot input, respectively. The primary sensor system also includes a monitor lane that includes a pitch channel and roll channel producing data indicative of pitch and roll pilot input, respectively. The data from the monitor lane is used to verify, in real time, the data from the command lane. Similarly, the redundant sensor system includes a command lane that includes a pitch channel and roll channel producing data indicative of pitch and roll pilot input, respectively. The redundant sensor system also includes a monitor lane that includes a pitch channel and roll channel producing data indicative of pitch and roll pilot input, respectively. The data from the monitor lane is used to verify, in real time, the data from the command lane. The force sensor may rely upon the redundant sensor system in the event of a failure in the primary sensor system (e.g., the monitor lane data does not verify the command lane data).

The flexible sensing element includes four flexible arms in an orthogonal geometry, such that compression/tension applied to one arm (e.g., due to a pitch force applied on a stick) produces an inverse tension/compression in the opposing arm at the same locations. Strain gauges are disposed on top and bottom surfaces of each arm to measure compression/tension on the surface. One orthogonal set of arms provides pitch data and roll data to the command lane, while the other set of orthogonal arms provided pitch data and roll data to the monitor lane. Thus, strain measurements from strain gauges on the top surfaces of the four flexible arms provides command lane data and monitor lane data to the primary sensor system, while strain measurements from strain gauges on the bottom surfaces of the four flexible arms provides command lane data and monitor lane data to the redundant sensor system. As such, a single flexible sensing element is capable of providing four independent lanes of pitch/roll data.

The configuration of the flexible sensing element further provides measurement of the force applied to a stick with an angle between pitch and roll. The amount of strain caused by the angle force follows the cosine rule with respect to pitch and roll direction. As such, the amount of strain measured on the four flexible arms may indicate the angle force applied on the stick, thus enabling a pilot to control the aircraft based on the angle force applied.

Therefore, embodiments in accordance with the present invention provide strain measurements from a single flexible sensing element with quadruple redundancy, thereby providing additional safety measures to an aircraft flight control system. Strain measured on a flexible arm of the positive channel can be verified by opposite strain on the flexible arm of the negative channel. Due to the configuration of the flexible sensing element, cross-talk between pitch and roll channels and tangential strain contamination is reduced. In the event of a failure in the primary sensor system, a completely redundant sensor system may be relied upon.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

Accordingly, while further examples are capable of various modifications and alternative forms, some particular examples thereof are shown in the Figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the Figures, which may be implemented identically or in modified form when compared to one another while providing for the same or a similar functionality.

Figure 1:
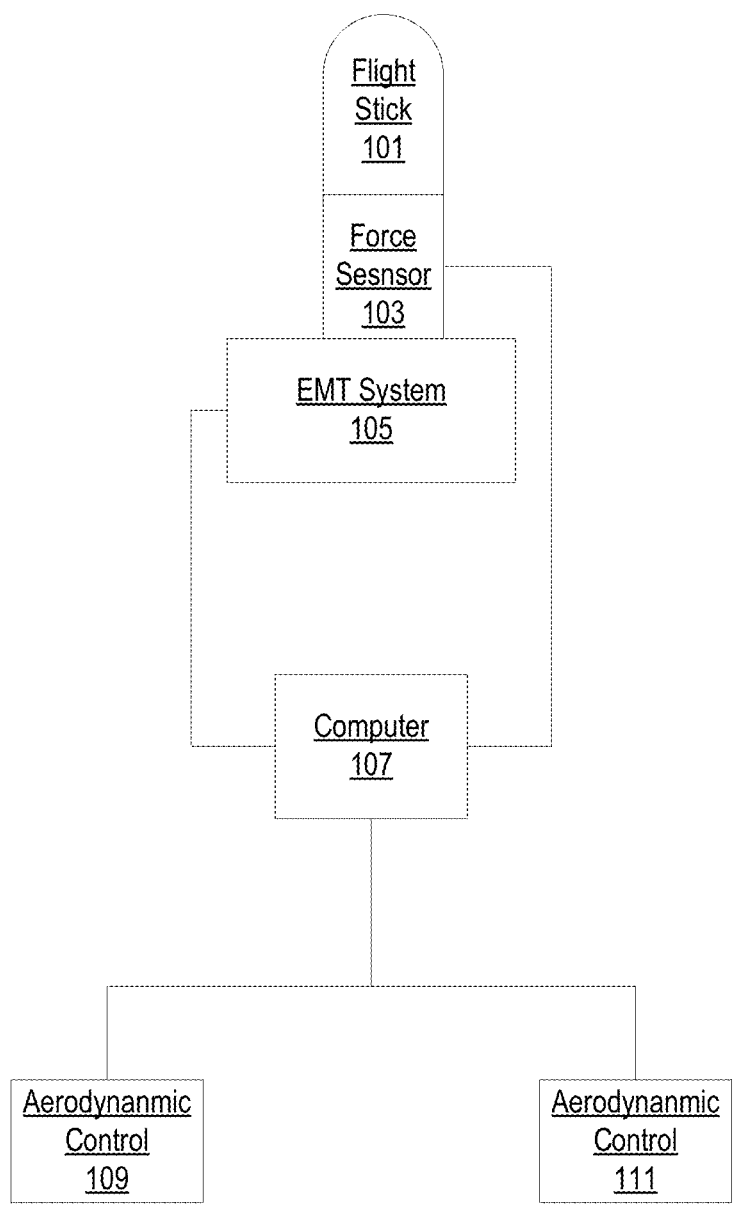
FIG. 1 illustrates an example configuration for a force sensor in an exemplary aircraft system.

Exemplary methods, systems, and apparatuses for quadruple redundancy in a force sensor assembly in accordance with the present invention are described with reference to the accompanying drawings, beginning with FIG. 1. FIG. 1 sets forth an exemplary flight control system that may be configured with a force sensor in accordance with embodiments of the present invention. The system (100) of FIG. 1 includes a flight stick (101), an electromechanical transducer (EMT) system (105) for converting rectilinear movements of the flight stick (101) into electrical signals, and a force sensor (103) for detecting a pitch force and a roll force applied to the flight stick (101) by a pilot, and an aircraft computer system (107) that interprets measurements from the force sensor (103) and the EMT system (105) and translates the measurements into forces to be applied to aerodynamic control components (109, 111) of the aircraft such as ailerons, flaps, rudders, elevators, and the like.

Figure 2:
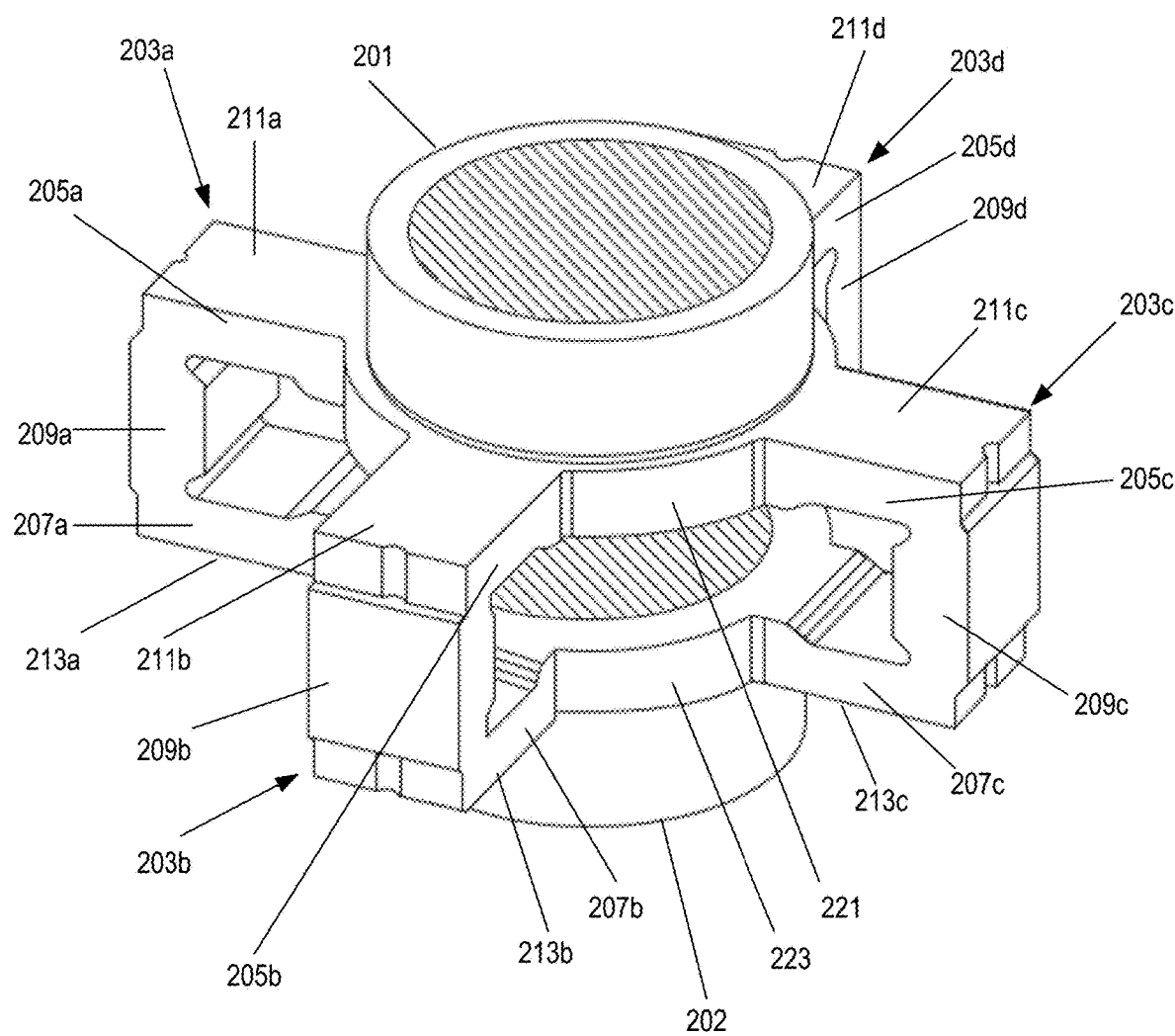
FIG. 2 illustrates a flexible sensing element in accordance with embodiments of the present invention.

FIG. 2 sets forth a diagram of a flexible sensing element (200) for use in a force sensor assembly with quadruple redundancy in accordance with embodiments of the present invention. The flexible sensing element (200) comprises four flexible arms (203a, 203b, 203c, 203d) connected to a top collar (221) on a hollow tube (201) and a bottom collar (223) on a second hollow tube (202), wherein the hollow tubes (201, 202) have the same dimensions and are coaxial. The four flexible arms may be equipped with strain gauges (described in detail below) that measure the compression and tension placed on each flexible arm as a result of force applied to a flight stick (not shown). Each of the four flexible arms includes, respectively, a top segment (205a, 205b, 205c, 205d), a bottom segment (207a, 207b, 207c, 207d), and a middle segment (209a, 209b, 209c, 209d) that is perpendicular to the top segment (205a, 205b, 205c, 205d), and the bottom segment (207a, 207b, 207c, 207d) such that together the top segments (205a, 205b, 205c, 205d), bottom segments (207a, 207b, 207c, 207d), and middle segments (209a, 209b, 209c, 209d) respectively form the four flexible arms connected to the first top collar (221) at one end and the bottom collar (223) at the other end, as shown in FIG. 2. In an embodiment, the four flexible arms, the top collar (221), and the bottom collar (223) may be formed as unitary body from a metal or metal alloy of which strain characteristics is known.

In FIG. 2, the flexible arm (203a) and the flexible arm (203c) are aligned along the X-axis while the flexible arm (203b) and the flexible arm (203d) are aligned along the Y-axis, which is orthogonal to the X-axis, such that flexible arm (203a) is orthogonal to the flexible arm (203b), which is orthogonal to the flexible arm (203c), which is orthogonal to the flexible arm (203d), which is orthogonal to the flexible arm (203a). In this configuration, cross-talk between pitch channels and roll channels is minimized in that strain measurements of one flexible arm do not substantially interfere with strain measurements of another flexible arm that is orthogonal.

For example, with reference to FIG. 2, the flexible arm (203a) provides a primary pitch command channel of pitch data to a primary sensor system and a redundant pitch command channel of pitch data to a redundant sensor system. The flexible arm (203a) includes the top segment (205a) and the bottom segment (207a), with the middle segment (209a) intersecting the top segment (205a) and the bottom segment (207a) at the ends opposite the join with the top collar (221) and the bottom collar (223). Although the flexible arm (203a) is described in terms of top segment (205a), bottom segment (207a), and middle segment (209a), these segments may be of unitary construction in forming the flexible arm (203a). A set of primary strain gauges (231a) (not shown in FIG. 2, see FIG. 3) for providing strain measurements of the top segment (205a) to the primary sensor system are disposed on a top surface (211a) of the top segment (205a) of the flexible arm (203a), and a set of redundant strain gauges (233a) (not shown in FIG. 2, see FIG. 4) for providing strain measurements of the bottom segment (207a) to the redundant sensor system are disposed on a bottom surface (213a) of the bottom segment (207a). The middle segment (209a) provides support to the top segment (205a) and the bottom segment (207a) while allowing each of these segments to flex in response to a force applied to the flexible sensing element (200), such that strain (compression or tension) can be measured on these segments while flexing. In an embodiment, strain measurements of compression and tension of the top segment (205a) substantially mirror the strain measurements of compression and tension of the bottom segment (207a) when force is applied to the flexible sensing element (200). The set of primary strain gauges (231a) provide a primary pitch command channel of pitch data the primary sensor system reflective of strain measured when a pitch force is applied to the flexible sensing element (200). The set of redundant strain gauges (233a) provide a redundant pitch command channel of pitch data to the redundant sensor system reflective of strain measured when a pitch force is applied to the flexible sensing element (200). In a particular embodiment, the redundant pitch command channel of pitch data from the redundant strain gauges (233a) provided to the redundant sensor system is used only when a failure is detected in the primary sensor system by a flight control system.

For example, with reference to FIG. 2, the flexible arm (203b) provides a primary roll command channel of roll data to a primary sensor system and a redundant roll command channel of roll data to a redundant sensor system. The flexible arm (203b) includes the top segment (205b) and the bottom segment (207b), with the middle segment (209b) intersecting the top segment (205b) and the bottom segment (207b) at the ends opposite the join with the top collar (221) and the bottom collar (223). Although the flexible arm (203b) is described in terms of top segment (205b), bottom segment (207b), and middle segment (209b), these segments may be of unitary construction in forming the flexible arm (203b). A set of primary strain gauges (231b) (not shown in FIG. 2, see FIG. 3) for providing strain measurements of the top segment (205b) to the primary sensor system are disposed on a top surface (211b) of the top segment (205b) of the flexible arm (203b), and a set of redundant strain gauges (233b) (not shown in FIG. 2, see FIG. 4) for providing strain measurements of the bottom segment (207b) to the redundant sensor system are disposed on a bottom surface (213b) of the bottom segment (207b). The middle segment (209b) provides support to the top segment (205b) and the bottom segment (207b) while allowing each of these segments to flex in response to a force applied to the flexible sensing element (200), such that strain (compression or tension) can be measured on these segments while flexing. In an embodiment, strain measurements of compression and tension of the top segment (205b) substantially mirror the strain measurements of compression and tension of the bottom segment (207b) when force is applied to the flexible sensing element (200). The set of primary strain gauges (231b) provide a primary roll command channel of roll data to the primary sensor system, reflective of strain measured when a roll force is applied to the flexible sensing element (200). The set of redundant strain gauges (233b) provide a channel of roll data to the redundant sensor system reflective of strain measured when a roll force is applied to the flexible sensing element (200). In a particular embodiment, the redundant roll command channel of roll data from the redundant strain gauges (233b) provided to the redundant sensor system is used only when a failure is detected in the primary sensor system by a flight control system.

In addition to primary and redundant command channels, the flexible sensing element (200) includes primary and redundant monitor channels as a failsafe to confirm measurements reflected in the command channels. The flexible sensing element (200) includes a primary pitch monitor channel as a failsafe channel that confirms the measurements reflected in the pitch data of the command channel of the primary sensor system. The flexible sensing element (200) includes a primary roll monitor channel as a failsafe channel that confirms the measurements reflected in the roll data of the command channel of the primary sensor system. The redundant pitch monitor channel acts as a failsafe channel that confirms the measurements reflected in the pitch data of the command channel of the redundant sensor system. The redundant roll monitor channel acts as a failsafe channel that confirms the measurements reflected in the roll data of the command channel of the redundant sensor system.

For example, with reference to FIG. 2, the flexible arm (203c) provides a primary pitch monitor channel of pitch data to a primary sensor system and a redundant monitor channel of pitch data to a redundant sensor system. The redundant pitch monitor channel is a failsafe channel that confirms the measurements reflected in the pitch data of the command channel of the redundant sensor system. The flexible arm (203c) includes the top segment (205c) and the bottom segment (207c), with the middle segment (209c) intersecting the top segment (205c) and the bottom segment (207c) at the ends opposite the join with the top collar (221) and the bottom collar (223). Although the flexible arm (203c) is described in terms of top segment (205c), bottom segment (207c), and middle segment (209c), these segments may be of unitary construction in forming the flexible arm (203c). A set of primary strain gauges (231c) (not shown in FIG. 2, see FIG. 3) for providing strain measurements of the top segment (205c) to the primary sensor system are disposed on a top surface (211c) of the top segment (205c) of the flexible arm (203c), and a set of redundant strain gauges (233c) (not shown in FIG. 2, see FIG. 4) for providing strain measurements of the bottom segment (207c) to the redundant sensor system are disposed on a bottom surface (213c) of the bottom segment (207c). The middle segment (209c) provides support to the top segment (205c) and the bottom segment (207c) while allowing each of these segments to flex in response to a force applied to the flexible sensing element (200), such that strain (compression or tension) can be measured on these segments while flexing. In an embodiment, strain measurements of compression and tension of the top segment (205c) substantially mirror the strain measurements of compression and tension of the bottom segment (207c) when force is applied to the flexible sensing element (200). The set of primary strain gauges (231c) provide a primary pitch monitor channel of pitch data the primary sensor system reflective of strain measured when a pitch force is applied to the flexible sensing element (200). The set of redundant strain gauges (233c) provide a redundant pitch monitor channel of pitch data to the redundant sensor system reflective of strain measured when a pitch force is applied to the flexible sensing element (200). The redundant pitch monitor channel of pitch data from the redundant strain gauges (233c) provided to the redundant sensor system is used only when a failure is detected in the primary sensor system by a flight control system.

For example, with reference to FIG. 2, the flexible arm (203d) provides a primary roll monitor channel of roll data to a primary sensor system and a redundant roll monitor channel of roll data to a redundant sensor system. The flexible arm (203d) includes the top segment (205d) and the bottom segment (207d), with the middle segment (209d) intersecting the top segment (205d) and the bottom segment (207d) at the ends opposite the join with the top collar (221) and the bottom collar (223). Although the flexible arm (203d) is described in terms of top segment (205d), bottom segment (207d), and middle segment (209d), these segments are of unitary construction in forming the flexible arm (203d). A set of primary strain gauges (231d) (not shown in FIG. 2, see FIG. 3) for providing strain measurements of the top segment (205d) to the primary sensor system are disposed on a top surface (211d) of the top segment (205d) of the flexible arm (203d), and a set of redundant strain gauges (233d) (not shown in FIG. 2, see FIG. 4) for providing strain measurements of the bottom segment (207d) to the redundant sensor system are disposed on a bottom surface (213d) of the bottom segment (207d). The middle segment (209d) provides support to the top segment (205d) and the bottom segment (207d) while allowing each of these segments to flex in response to a force applied to the flexible sensing element (200), such that strain (compression or tension) can be measured on these segments while flexing. In an embodiment, strain measurements of compression and tension of the top segment (205d) substantially mirror the strain measurements of compression and tension of the bottom segment (207d) when force is applied to the flexible sensing element (200). The set of primary strain gauges (231d) provide a primary roll monitor channel of roll data the primary sensor system reflective of strain measured when a roll force is applied to the flexible sensing element (200). The set of redundant strain gauges (233d) provide a redundant roll monitor channel of roll data to the redundant sensor system reflective of strain measured when a roll force is applied to the flexible sensing element (200). The redundant roll monitor channel of roll data from the redundant strain gauges (233d) provided to the redundant sensor system is used only when a failure is detected in the primary sensor system by a flight control system.

Thus, the strain measured on the flexible arm (203a) in the command is equal and opposite to the strain measured on the flexible arm (203c) in the monitor channel in response to a pitch force on the flight stick. Likewise, the strain measured on the flexible arm (203b) in the command is equal and opposite to the strain measured on the flexible arm (203d) in the monitor channel in response to a roll force on the flight stick.

Figure 3:
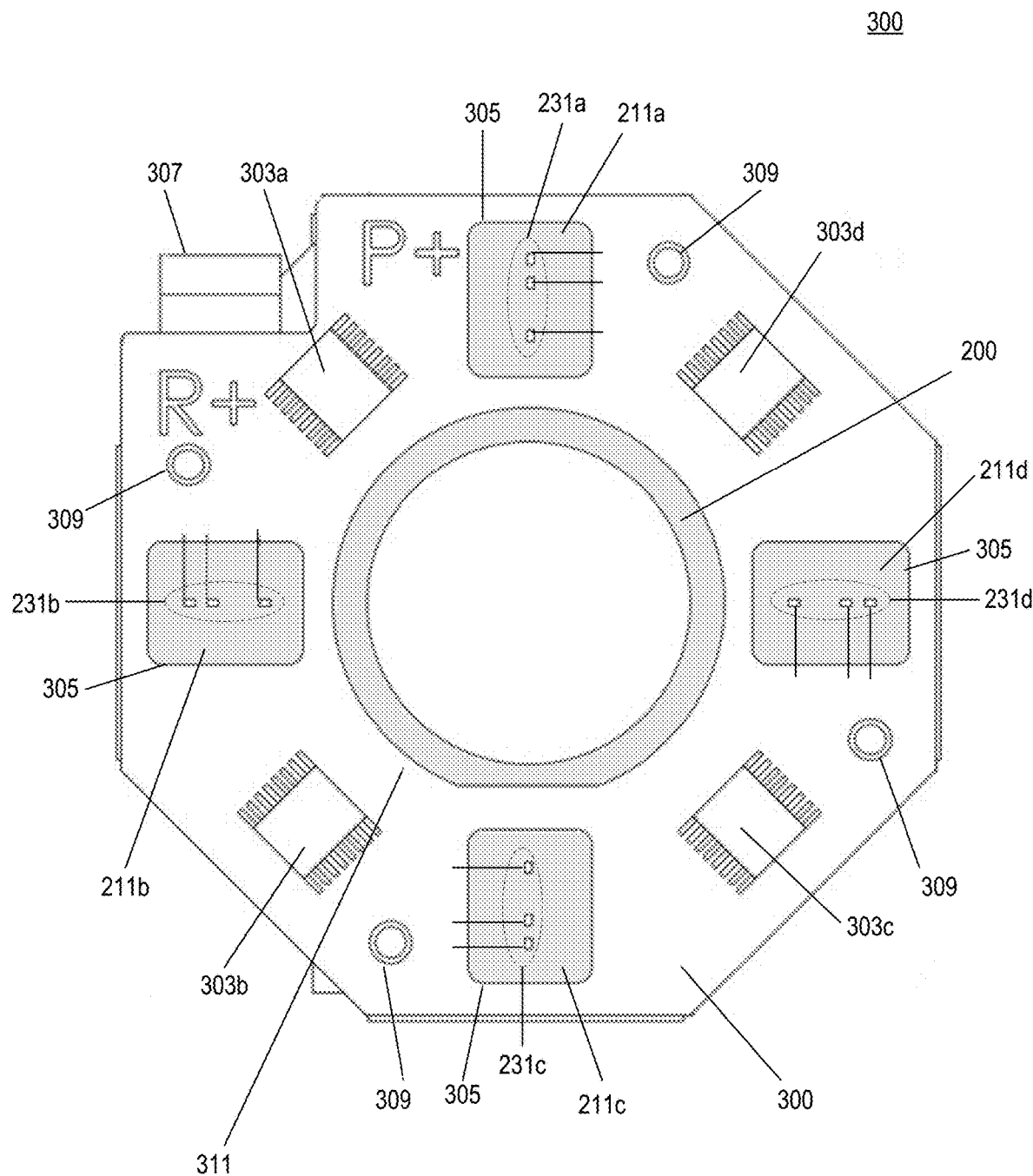
FIG. 3 illustrates a printed circuit board for a primary sensor system in accordance with embodiments of the present invention.

With continued reference to FIGS. 2-3, the pitch data from the strain gauges (231a) and the roll data from the strain gauges (231b) are combined to generate a signal representing a command lane for the primary sensor system. The signal representing the command lane is used by the flight control computer (not shown) for providing operational instructions for the aircraft. The pitch data from the strain gauges (231c) and the roll data from the strain gauges (231d) are combined to generate a signal representing a monitor lane for the primary sensor system. The signal representing the monitor lane confirms the signal generated in the command lane. The pitch data from the strain gauges (233a) and the roll data from the strain gauges (233b) are combined to generate a signal representing a command lane for the redundant sensor system. The signal representing the command lane is used by the flight control computer (not shown) for providing operational instructions for the aircraft in the event that there is a failure in the primary sensor system. The pitch data from the strain gauges (233c) and the roll data from the strain gauges (233d) are combined to generate a signal representing a monitor lane for the redundant sensor system. The signal representing the monitor lane confirms the signal generated in the command lane.

For further explanation, FIG. 3 sets forth of a diagram of a primary sensor system printed circuit board (PCB) (300) for a force sensor assembly with quadruple redundancy according to embodiments of the present invention. The primary sensor system PCB (300) rests above the top of the four flexible arms of the flexible sensing element (200) (FIG. 2) and includes cutouts (305) partially exposing the top surfaces (211a, 211b, 211c, 211d) of the top segments (205a, 205b, 205c, 205d), respectively, of the flexible sensing element (200), such that the strain gauges (231a, 231b, 231c, 231d) are exposed. Through the cutouts (305), the strain gauges (231a, 231b, 231c, 231d) are wire-bonded to the PCB (300). The primary sensor system PCB (300) includes four application specific integrated circuits (ASICs) each corresponding, respectively, to the pitch channel of the command lane, the roll channel of the command lane, the pitch channel of the monitor lane, and the roll channel of the monitor lane, as will be described in greater detail below. The primary sensor system PCB (300) also includes additional circuitry for translation of signals in the ASIC domain to signals in the system domain. For example, the additionally circuitry may include a block of reference signal circuitry for establishment of the center point of the ASIC domain, a block of amplifier circuitry, and a block of input/output circuitry for physical layer conditioning and protection of the command lane and monitor lane components. The primary sensor system PCB (300) provides output signals for the command lane and the monitor lane via a flexible ribbon (307) connected to a connector card (not shown in FIG. 3). The primary sensor system PCB (300) further includes a central aperture (311) for accommodating the hollow tube (201) of the flexible sensing element (200). The primary sensor system PCB (300) may include mounting holes (309) for mounting the PCB (300) on heat stakes (not shown in FIG. 3).

With reference to FIG. 3, the ASIC (303a) takes, as input, measurement signals from the strain gauges (231a) disposed on the surface (211a) of the top segment (205a) of the flexible arm (203a), representing the pitch channel for the command lane of the primary sensor system. As previously discussed, the strain gauges (231a) measure the strain on the flexible arm (203a) at multiple locations on the surface (211a) of the flexible arm (203a). The ASIC (303a) receives the measurement signals from the interconnected strain gages (231a) through the wire bond connection between the strain gages (231a) and the primary sensor system PCB (300). The ASIC (303a) conditions the measurement signals from the strain gauges (231a) to generate a pitch force signal for the command lane of the primary sensor system. In one embodiment, the ASIC (303a) uses a single full-bridge gauge configuration, the bridge source is a temperature-dependent DC voltage, the inputs are connected in negative polarity, and the ASIC (303a) inverts the signal for positive polarity output.

With continued reference to FIG. 3, the ASIC (303b) takes, as input, measurement signals from the strain gauges (231b) disposed on the surface (211b) of the top segment (205b) of the flexible arm (203b), representing the roll channel for the command lane of the primary sensor system. As previously discussed, the strain gauges (231b) measure the strain on the flexible arm (203b) at multiple locations on the surface (211b) of the flexible arm (203b). The ASIC (303b) receives the measurement signals from the interconnected strain gages (231b) through the wire bond connection between the strain gages (231b) and the primary sensor system PCB (300). The ASIC (303b) conditions the measurement signals from the strain gauges (231b) to generate a roll force signal for the command lane of the primary sensor system. In one embodiment, the ASIC (303b) uses single full-bridge gauge configuration, the bridge source is a temperature-dependent DC voltage, inputs are connected in negative polarity, and the ASIC (303b) inverts the signal for positive polarity output.

With continued reference to FIG. 3, the ASIC (303c) takes, as input, measurement signals from the strain gauges (231c) disposed on the surface (211c) of the top segment (205c) of the flexible arm (203c), representing the pitch channel for the monitor lane of the primary sensor system. As previously discussed, the strain gauges (231c) measure the strain on the flexible arm (203c) at multiple locations on the surface (211c) of the flexible arm (203c). The ASIC (303c) receives the measurement signals from the interconnected strain gages (231c) through the wire bond connection between the strain gages (231c) and the primary sensor system PCB (300). The ASIC (303c) conditions the measurement signals from the strain gauges (231c) to generate a pitch force signal for the monitor lane of the primary sensor system. In one embodiment, the ASIC (303c) is different from either the ASIC (303a) or the ASIC (303b) in that the ASIC (303c) uses a dual half-bridge gauge configuration, the bridge sources are temperature-dependent DC current, the inputs are connected in negative polarity, and the ASIC (303c) has a negative polarity output.

With continued reference to FIG. 3, the ASIC (303d) takes, as input, measurement signals from the strain gauges (231d) disposed on the surface (211d) of the top segment (205d) of the flexible arm (203d), representing the roll channel for the monitor lane of the primary sensor system. As previously discussed, the strain gauges (231d) measure the strain on the flexible arm (203d) at multiple locations on the surface (211d) of the flexible arm (203d). The ASIC (303d) receives the measurement signals from the interconnected strain gages (231d) through the wire bond connection between the strain gages (231d) and the primary sensor system PCB (300). The ASIC (303d) conditions the measurement signals from the strain gauges (231d) to generate a roll force signal for the monitor lane of the primary sensor system. In one embodiment, the ASIC (303d) is different from either the ASIC (303a) or the ASIC (303b) in that the ASIC (303d) uses a dual half-bridge gauge configuration, the bridge sources are temperature-dependent DC current, the inputs are connected in negative polarity, and the ASIC (303d) has a negative polarity output.

Figure 4:
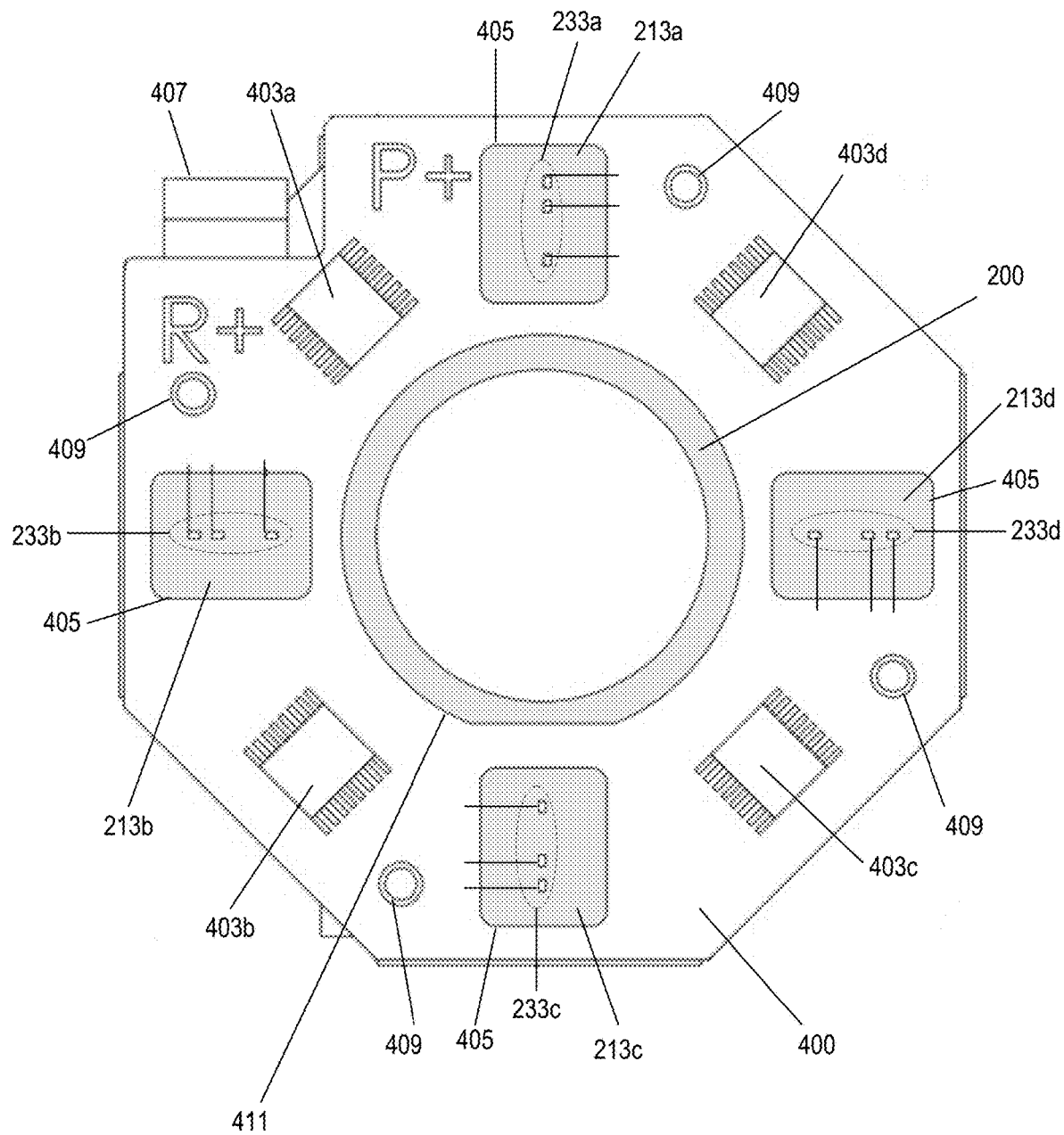
FIG. 4 illustrates a printed circuit board for a redundant sensor system in accordance with embodiments of the present invention.

For further explanation, FIG. 4 sets forth of a diagram of a redundant sensor system printed circuit board (PCB) (400) for a force sensor assembly with quadruple redundancy according to embodiments of the present invention. The redundant sensor system PCB (400) rests below the bottom of the four flexible arms of the flexible sensing element (200) (FIG. 2) and includes cutouts (405) partially exposing the bottom surfaces (213a, 213b, 213c, 213d) of the bottom segments (207a, 207b, 207c, 207d), respectively, of the flexible sensing element (200), such that the strain gauges (233a, 233b, 233c, 233d) are exposed. Through the cutouts (405), the strain gauges (233a, 233b, 233c, 233d) are wire-bonded to the PCB (400). The redundant sensor system PCB (400) includes four application specific integrated circuits (ASICs) each corresponding, respectively, to the pitch channel of the command lane, the roll channel of the command lane, the pitch channel of the monitor lane, and the roll channel of the monitor lane, as will be described in greater detail below. The redundant sensor system PCB (400) also includes additional circuitry for translation of signals in the ASIC domain to signals in the system domain. For example, the additionally circuitry may include a block of reference signal circuitry for establishment of the center point of the ASIC domain, a block of amplifier circuitry, and a block of input/output circuitry for physical layer conditioning and protection of the command lane and monitor lane components. The redundant sensor system PCB (400) provides output signals for the command lane and the monitor lane via a flexible ribbon (407) connected to a connector card (not shown in FIG. 4). The redundant sensor system PCB (400) further includes a central aperture (411) for accommodating the hollow tube (202) of the flexible sensing element (200). The redundant sensor system PCB (400) may include mounting holes (409) for mounting the PCB (400) on heat stakes (not shown in FIG. 4).

With reference to FIG. 4, the ASIC (403a) takes, as input, measurement signals from the strain gauges (233a) disposed on the surface (213a) of the bottom segment (207a) of the flexible arm (203a), representing the pitch channel for the command lane of the redundant sensor system. As previously discussed, the strain gauges (233a) measure the strain on the flexible arm (203a) at multiple locations on the surface (213a) of the flexible arm (203a). The ASIC (403a) receives the measurement signals from the interconnected strain gages (233a) through the wire bond connection between the strain gages (233a) and the redundant sensor system PCB (400). The ASIC (403a) conditions the measurement signals from the strain gauges (233a) to generate a pitch force signal for the command lane of the redundant sensor system. In one embodiment, the ASIC (403a) uses single full-bridge gauge configuration, the bridge source is a temperature-dependent DC voltage, inputs are connected in negative polarity, and the ASIC (403a) inverts the signal for positive polarity output.

With continued reference to FIG. 4, the ASIC (403b) takes, as input, measurement data from the strain gauges (233b) disposed on the surface (213b) of the bottom segment (207b) of the flexible arm (203b), measurement signals representing the roll channel for the command lane of the redundant sensor system. As previously discussed, the strain gauges (233b) measure the strain on the flexible arm (203b) at multiple locations on the surface (213b) of the flexible arm (203b). The ASIC (403b) receives the measurement signals from the interconnected strain gages (233b) through the wire bond connection between the strain gages (233b) and the redundant sensor system PCB (400). The ASIC (403b) conditions the measurement signals from the strain gauges (233b) to generate a roll force signal for the command lane of the redundant sensor system. In one embodiment, the ASIC (403b) uses single full-bridge gauge configuration, the bridge source is a temperature-dependent DC voltage, inputs are connected in negative polarity, and the ASIC (403b) inverts the signal for positive polarity output.

With continued reference to FIG. 4, the ASIC (403c) takes, as input, measurement signals from the strain gauges (233c) disposed on the surface (213c) of the bottom segment (207c) of the flexible arm (203c), representing the pitch channel for the monitor lane of the redundant sensor system. As previously discussed, the strain gauges (233c) measure the strain on the flexible arm (203c) at multiple locations on the surface (213c) of the flexible arm (203c). The ASIC (403c) receives the measurement signals from the interconnected strain gages (233c) through the wire bond connection between the strain gages (233c) and the redundant sensor system PCB (400). The ASIC (403c) conditions the measurement signals from the strain gauges (233c) to generate a pitch force signal for the monitor lane of the redundant sensor system. In one embodiment, the ASIC (403c) is different from either the ASIC (403a) or the ASIC (403b) in that the ASIC (403c) uses a dual half-bridge gauge configuration, the bridge sources are temperature-dependent DC current, the inputs are connected in negative polarity, and the ASIC (403c) has a negative polarity output.

With continued reference to FIG. 4, the ASIC (403d) takes, as input, measurement signals from the strain gauges (233d) disposed on the surface (213d) of the bottom segment (207d) of the flexible arm (203d), representing the roll channel for the monitor lane of the redundant sensor system. As previously discussed, the strain gauges (233d) measure the strain on the flexible arm (203d) at multiple locations on the surface (213d) of the flexible arm (203d). The ASIC (403d) receives the measurement signals from the interconnected strain gages (233d) through the wire bond connection between the strain gages (233d) and the redundant sensor system PCB (400). The ASIC (403d) conditions the measurement signals from the strain gauges (233d) to generate a roll force signal for the monitor lane of the redundant sensor system. In one embodiment, the ASIC (403d) is different from either the ASIC (403a) or the ASIC (403b) in that the ASIC (403d) uses a dual half-bridge gauge configuration, the bridge sources are temperature-dependent DC current, the inputs are connected in negative polarity, and the ASIC (403d) has a negative polarity output.

Figure 5:
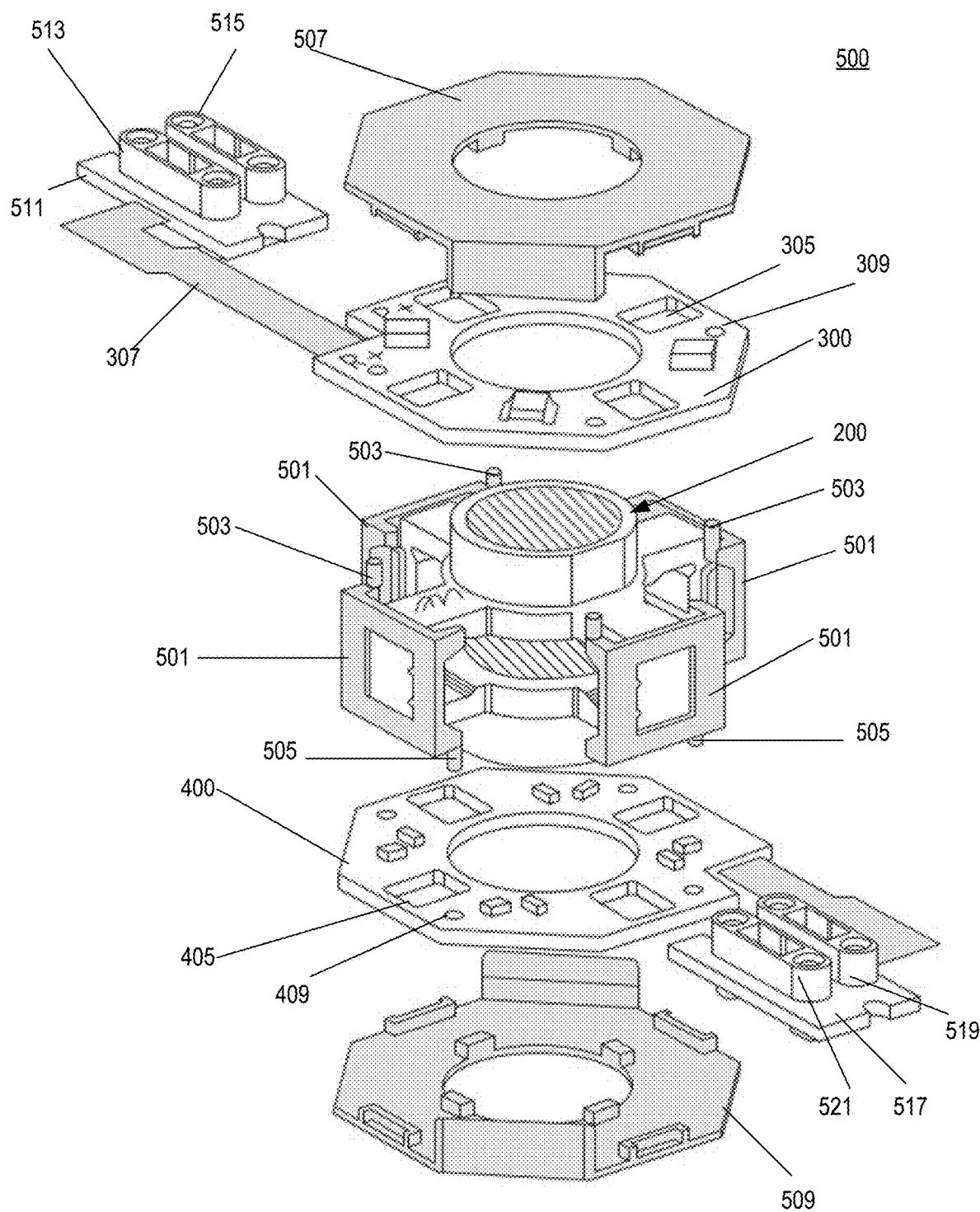
FIG. 5 illustrates an electrical component assembly in accordance with embodiments of the present invention.

For further explanation, FIG. 5 sets forth an exploded view of an electrical component assembly (500) for a force sensor assembly with quadruple redundancy according to embodiments of the present invention. The electrical component assembly (500) includes the flexible sensing element (200) of FIG. 2, the primary sensor system PCB (300) of FIG. 3, and the redundant sensor system PCB (400) of FIG. 4. The electrical component assembly (500) further includes support members (501) attached to the middle segment of each of the four flexible arms of the flexible sensing element (200). Each support member includes at least one top heat stake (503) configured to engage a mounting hole (309) of the primary sensor system PCB (300), and at least one bottom heat stake (505) configured to engage a mounting hole (409) of the redundant sensor system PCB (400). Accordingly, the primary sensor system PCB (300) and the redundant sensor system PCB (400) are supported by the support members (501). The electrical component assembly (500) further includes a top cover (507) that attaches to support members (501) from above the primary sensor system PCB (300), thereby further securing the primary sensor system PCB (300) in place and providing protection to electrical components and the exposed strain gauges (231a, 231b, 231c, 231d) and respective wire bonds. The electrical component assembly (500) further includes a bottom cover (509) that attaches to the support members (501) from below the redundant sensor system PCB (400), thereby further securing the redundant sensor system PCB (400) in place and providing protection to electrical components and the exposed strain gauges (233a, 233b, 233c, 233d) and respective wire bonds.

With continued reference to FIG. 5, the flexible ribbon (307) of the primary sensor system PCB (300) electrically couples the primary sensor system PCB (300) to a connector card (511). Signals generated from the command lane and the monitor lane of primary sensor system PCB (300) are provided to the connector card (511) in signal traces of the flexible ribbon (307). Each signal trace of the flexible ribbon (307) is routed through the connector card (511) to a pin of a connector (513, 515). The connector card mounts one connector (513) for outputting the command lane of the primary sensor system PCB (300) and one connector (515) for outputting the monitor lane of the primary sensor system PCB (300).

With continued reference to FIG. 5, the flexible ribbon (407) of the redundant sensor system PCB (400) electrically couples the redundant sensor system PCB (400) to a connector card (517). Signals generated from the command lane and the monitor lane of redundant sensor system PCB (400) are provided to the connector card (517) in signal traces of the flexible ribbon (407). Each signal trace of the flexible ribbon (407) is routed through the connector card (517) to a pin of a connector (519, 521). The connector card mounts one connector (519) for outputting the command lane of the redundant sensor system PCB (400) and one connector (521) for outputting the monitor lane of the redundant sensor system PCB (400).

Figure 6:
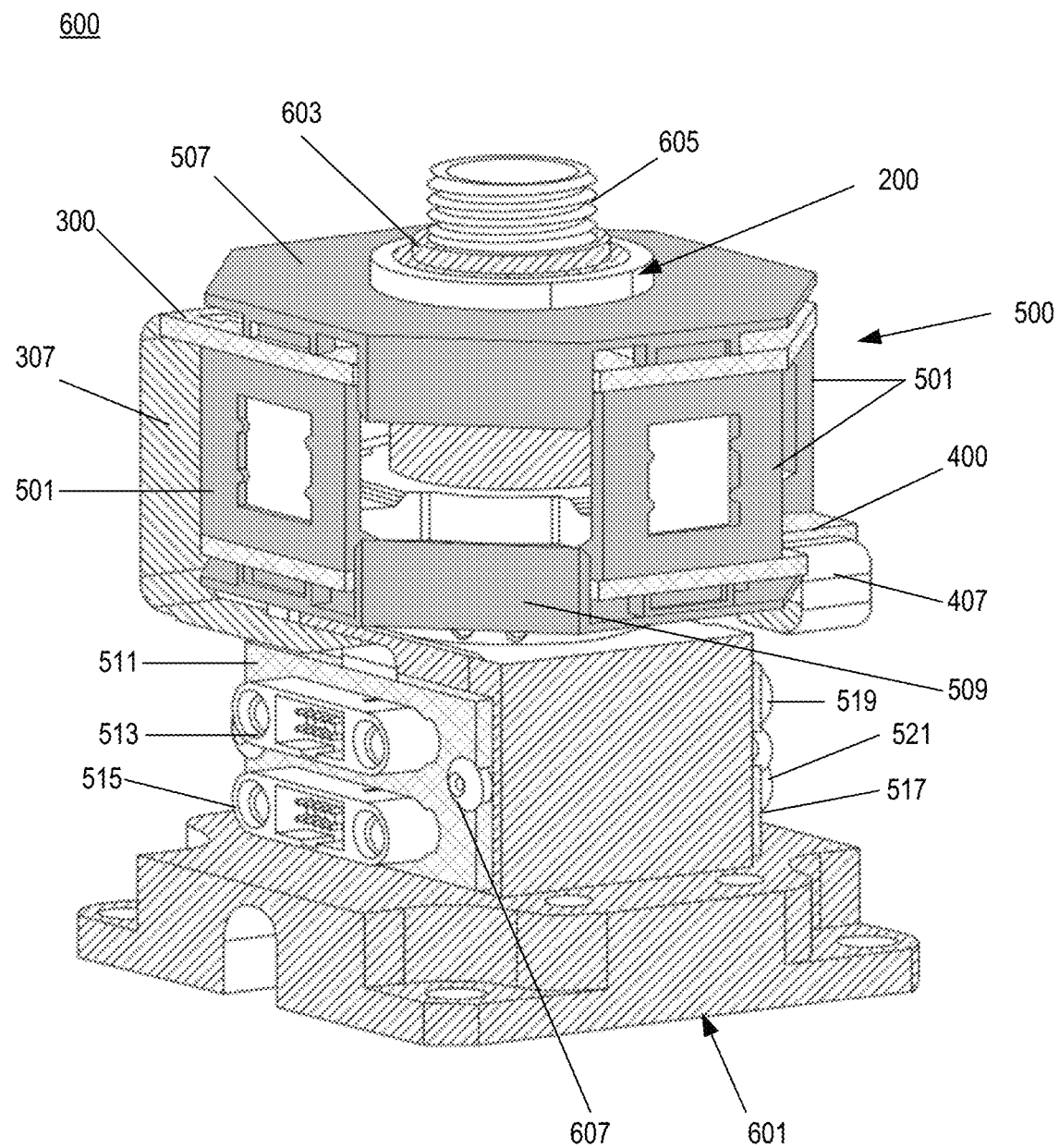
FIG. 6 illustrates a perspective view of a partially assembled force sensor assembly in accordance with embodiments of the present invention.

For further explanation, FIG. 6 sets forth a partially assembled force sensor assembly (600) according to embodiments of the present invention. The partially assembled force sensor assembly (600) of FIG. 6 includes the electrical component assembly (500) of FIG. 5, with like components being represented by like reference numerals. Like FIG. 5, FIG. 6 shows the electrical component assembly (500) of FIG. 5 includes the top cover (507) disposed on the primary sensor system PCB (300), which is supported by the support members (501) over the top surfaces of the four flexible arms of the flexible sensing element (200). The flexible ribbon (307) connects the output of the primary sensor system PCB (300) to the connector card (511) that routes the output to the command lane output connectors (513, 515).

FIG. 6 also shows, as part of the electrical component assembly (500) of FIG. 5, the bottom cover (509) disposed below the redundant sensor system PCB (400), which is supported by the support members (501) below the bottom surfaces of the four flexible arms of the flexible sensing element (200). The flexible ribbon (407) connects the output of the redundant sensor system PCB (400) to the connector card (517) that routes the output to the monitor lane output connectors (519, 521).

With continued reference to FIG. 6, the electrical component assembly (500) and flexible sensing element (200) are mounted on a base (601). A shaft (603) of the base (601) is inserted through the hollow tubes (201, 202) of the flexible sensing element (200). The flexible sensing element may be mounted on the shaft (603) and the base (601) by, for example, welding. The shaft (603) includes thread (605) for securing a top flange that supports a pilot control grip (not shown in FIG. 6). The connector cards (511, 517) are mounted on the base (601) via screws (607).

Figure 7:
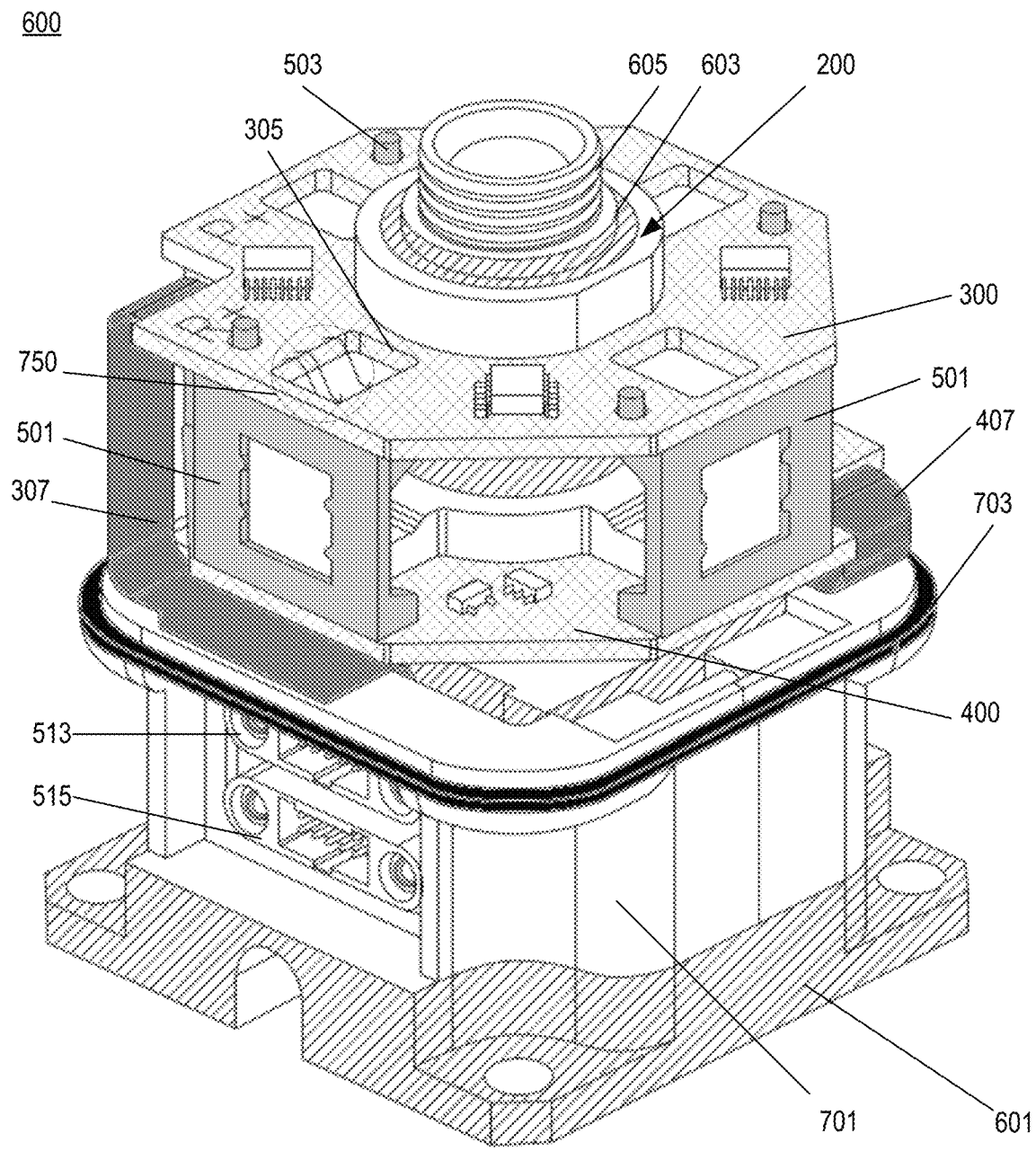
FIG. 7 illustrates another perspective view of a partially assembled force sensor assembly in accordance with embodiments of the present invention.

For further explanation, FIG. 7 sets forth another view of the partially assembled force sensor assembly (600) of FIG. 6 according to embodiments of the present invention. FIG. 7 illustrates the electrical component assembly (500) of FIG. 5, like components being represented by like reference numerals, mounted on a base (601). For visualization, the top cover (507) and the bottom cover (509) are omitted from FIG. 7. Like FIG. 5, FIG. 7 shows the electrical component assembly (500) of FIG. 5 that includes the primary sensor system PCB (300), which is supported by the support members (501) via heat stakes (503) over the top surfaces of the four flexible arms of the flexible sensing element (200). Wire bonds (750) connect strain gauges on the top surfaces of the four flexible arms to the primary sensory system PCB (300) through cutouts (305). The flexible ribbon (307) connects the output of the primary sensor system PCB (300) to the connector card (not shown) that routes the output to the command lane output connectors (513, 515). The flexible ribbon (407) connects the output of the redundant sensor system PCB (400) to the connector card (not shown) that routes the output to the monitor lane output connectors (not shown).

Like FIG. 6, FIG. 7 shows the partially assembled force sensor assembly (600) including the electrical component assembly (500) and flexible sensing element (200) mounted on a base (601). A shaft (603) of the base (601) is inserted through the hollow tubes (201, 202) of the flexible sensing element (200). The flexible sensing element may be mounted on the shaft (603) and the base (601) by, for example, welding. The shaft (603) includes thread (605) for securing a top flange that supports a pilot control grip (not shown in FIG. 7).

FIG. 7 further shows that the partially assembled force sensor assembly (600) includes a wall (701) that is secured around the base (601). The wall (701) protects the connector cards (511, 517) and respective connections to the flexible ribbons (307, 407) while providing support for additional packaging components such as an electromagnetic interference shield. Also shown in FIG. 7 is a gasket (703) for sealing an interface with additional packaging components (see FIG. 9A and FIG. 9B).

Figure 8:
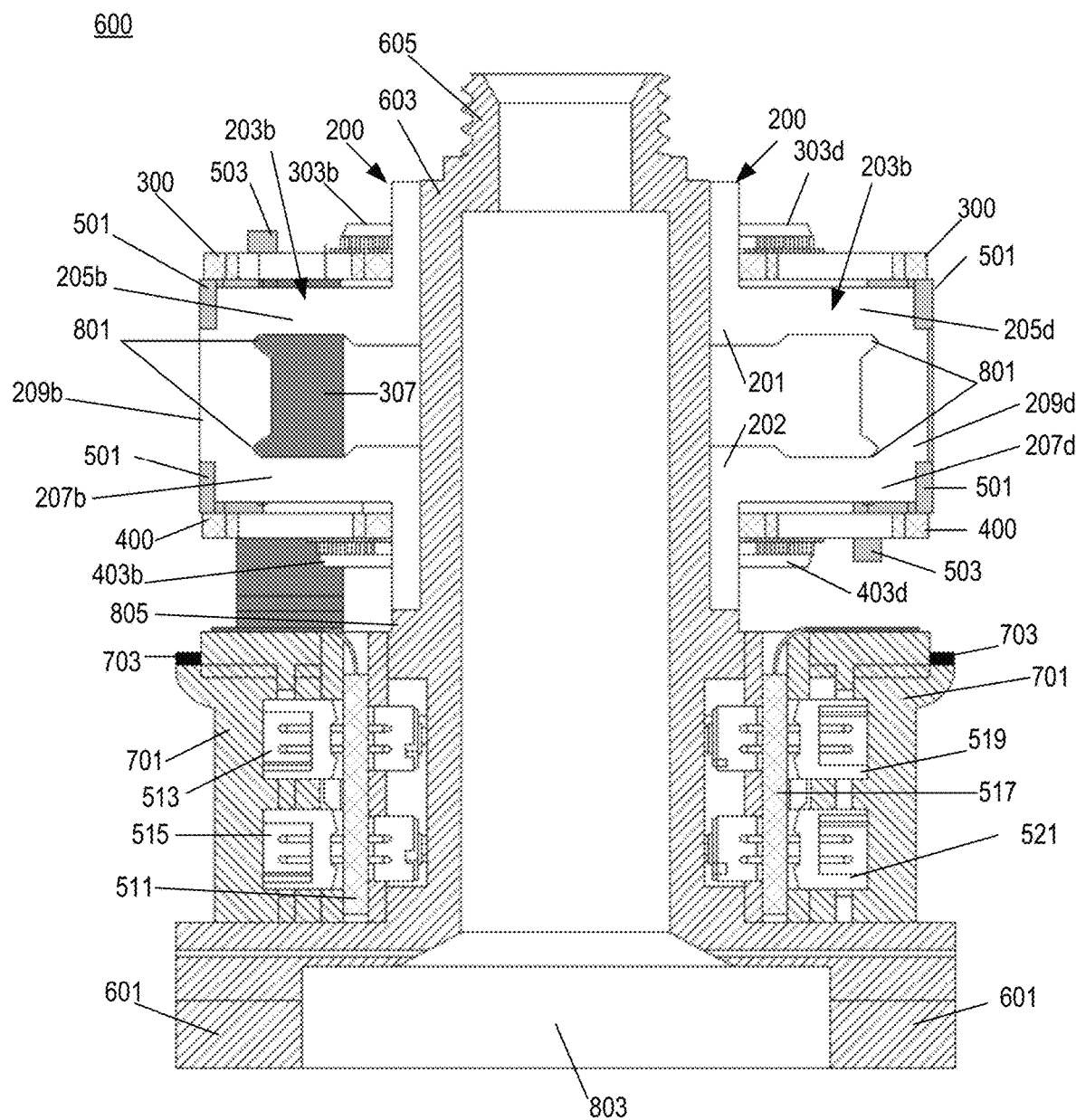
FIG. 8 illustrates a cross-section view of a partially assembled force sensor assembly in accordance with embodiments of the present invention.

For further explanation, FIG. 8 sets forth a cross section view of the partially assembled force sensor assembly (600) shown in FIG. 7 according to embodiments of the present invention. FIG. 8 is a cross section view such that FIG. 8 depicts cross sections of the flexible arm (203b) and the flexible arm (203d), while the flexible arm (203a) and the flexible arm (203c) cannot be seen from this view. FIG. 8 illustrates the flexible sensing element (200) mounted on the base (601) and around the base shaft (603), which includes the nut (605) for mounting a top flange (not shown). Like FIG. 5, FIG. 8 shows that the primary sensor system PCB (300), including ASICs (303b, 303d), is supported by the support members (501) via heat stakes (503) over the top surfaces of the four flexible arms of the flexible sensing element (200). The flexible ribbon (307) connects the output of the primary sensor system PCB (300) to the connector card (511) that routes the output to the command lane output connector (513) and monitor lane output connector (515). FIG. 8 also shows that the redundant sensor system PCB (400), including ASICs (403b, 403d), is supported by the support members (501) via heat stakes (503) below the bottom surfaces of the four flexible arms of the flexible sensing element (200). The flexible ribbon (not visible) connects the output of the primary sensor system PCB (400) to the connector card (517) that routes the output to the command lane output connector (519) and monitor lane output connector (521). Like FIG. 7, FIG. 8 illustrates the wall (701) and seal (703).

FIG. 8 further illustrates that, for all of the four flexible arms, a groove is formed at the join of the top segment and the middle segment and at the join of the bottom segment and the middle segment to allow compression and tension in the flexible arm. For example, FIG. 8 shows a groove (801) formed at the join of the top segment (205b) and the middle segment (209b) of the flexible arm (203b), and a groove (801) formed at the join of the bottom segment (207b) and the middle segment (209b). FIG. 8 also shows a groove (801) formed at the join of the top segment (205d) and the middle segment (209d) of the flexible arm (203d), and a groove (801) formed at the join of the bottom segment (207d) and the middle segment (209d). Also further shown in FIG. 8 is that the hollow tubes (201, 202) of flexible sensing element (200) are disposed around the base shaft (603) such that the flexible sensing element (200) is seated on a bottom flange (805) of the base (601). The base (601) and base shaft (603) are disposed over and around a flight stick shaft (803).

Figure 9A:
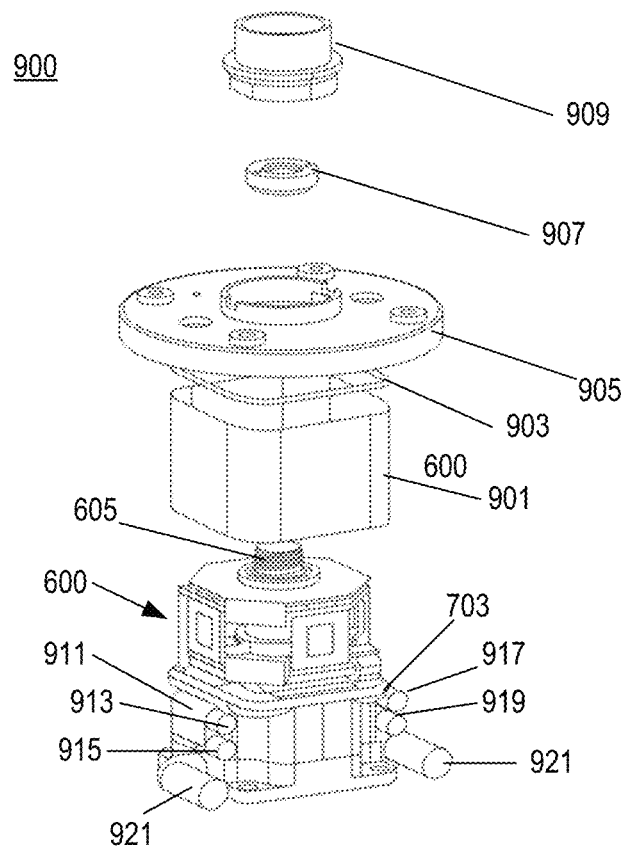
FIG. 9A illustrates an exploded view of an assembled force sensor assembly in accordance with embodiments of the present invention.
Figure 9B:
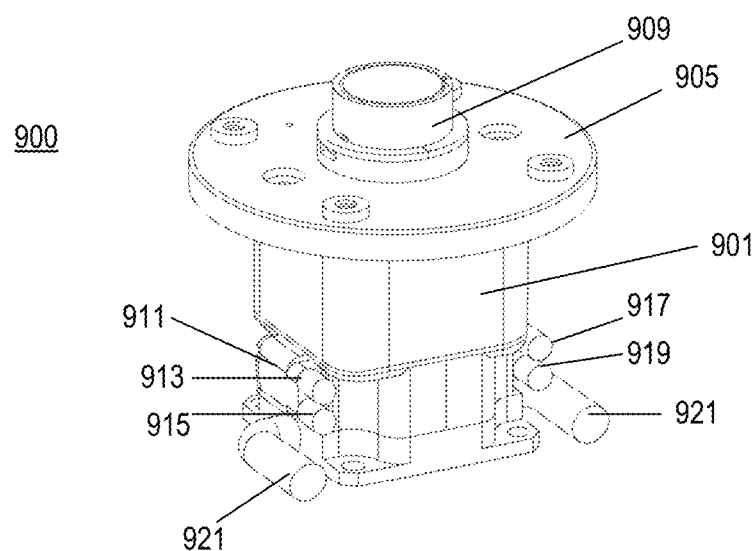
FIG. 9B illustrates a perspective view of an assembled force sensor assembly in accordance with embodiments of the present invention.

For further explanation, FIG. 9A sets forth an exploded view and FIG. 9B sets forth an assembled view of a force sensor assembly according to embodiments of the present invention. The force sensor assembly (900) includes the partially assembled for sensor assembly (600) of FIG. 6, and further includes an electromagnetic interference (EMI) shield (901) enclosing the electrical component assembly (500) (see FIG. 5 and FIG. 6) to isolate the ASICs, strain gauges, and other circuitry and signals from EMI. The EMI shield (901) is seated on the seal (703) on the base (601). The flange (905) is secured to the base shaft (603) via a nut (907) and thread (605). A second seal gasket (903) is placed between the flange (905) and the EMI shield (901). The flange (905) includes bore holes for attaching a pilot flight control grip. A cap (909) is affixed to the flange (905) to seal the aperture for the nut (907).

With continued reference to FIG. 9A and FIG. 9B, the force sensor assembly (900) also includes a bracket (911) for clamping shielded output cables (913, 915) to the base (601). The shielded output cable (913) provides an output signal from the command lane connector (511) of the primary sensor system. The shielded output cable (913) provides an output signal from the monitor lane connector (513) of the primary sensor system. The force sensor assembly (900) also includes a bracket (not depicted) for clamping shielded output cables (917, 919) to the base (601). The shielded output cable (917) provides an output signal from the command lane connector (519) of the redundant sensor system. The shielded output cable (919) provides an output signal from the monitor lane connector (521) of the redundant sensor system. Flight control cables (921) provide signals to and from a flight stick grip (not shown) passing through the shaft (803) of the flight stick.

Figure 10:
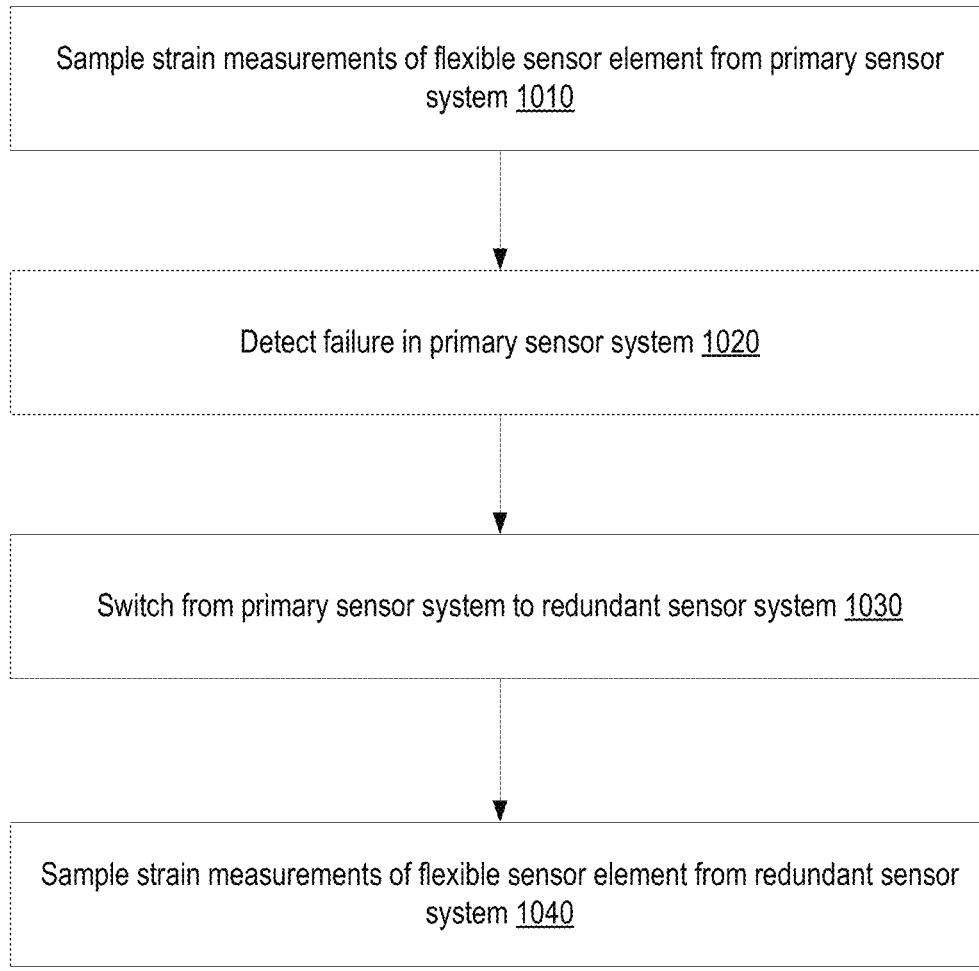
FIG. 10 sets forth a flow chart illustrating a method for a force sensor assembly with quadruple redundancy in in accordance with embodiments of the present invention.

For further explanation, FIG. 10 sets forth a flow chart illustrating an exemplary method for operating a force sensor with quadruple redundancy according to embodiments of the present invention that includes sampling (1010) strain measurements of a flexible sensing element from a primary sensor system. Sampling (1010) strain measurements of the flexible sensing element from the primary sensor system may be carried out by the aircraft flight control computer (107) sampling strain measurements of the flexible sensing element (200) from the primary sensor system (300).

The method of FIG. 10 also includes detecting (1020) a failure in the primary sensor system. Detecting (1020) a failure in the primary sensor system may be carried out by the aircraft flight control computer (107) detecting a failure in the primary sensor system (300). For example, the aircraft flight control computer (107) may determine that the command lane readings do not agree with the monitor lane readings.

The method of FIG. 10 also includes switching (1030) from the primary sensor system to a redundant sensor system. Switching (1030) from the primary sensor system to the redundant sensor system may be carried out by the aircraft flight control computer (107) switching from the primary sensor system (300) to the redundant sensor system (400).

The method of FIG. 10 also includes sampling (1040) strain measurements of the flexible sensing element from the redundant sensor system. Sampling (1040) strain measurements of the flexible sensing element from the redundant sensor system may be carried out by the aircraft flight control computer (107) sampling strain measurements of the flexible sensing element (200) from the redundant sensor system (400).

Figure 11:
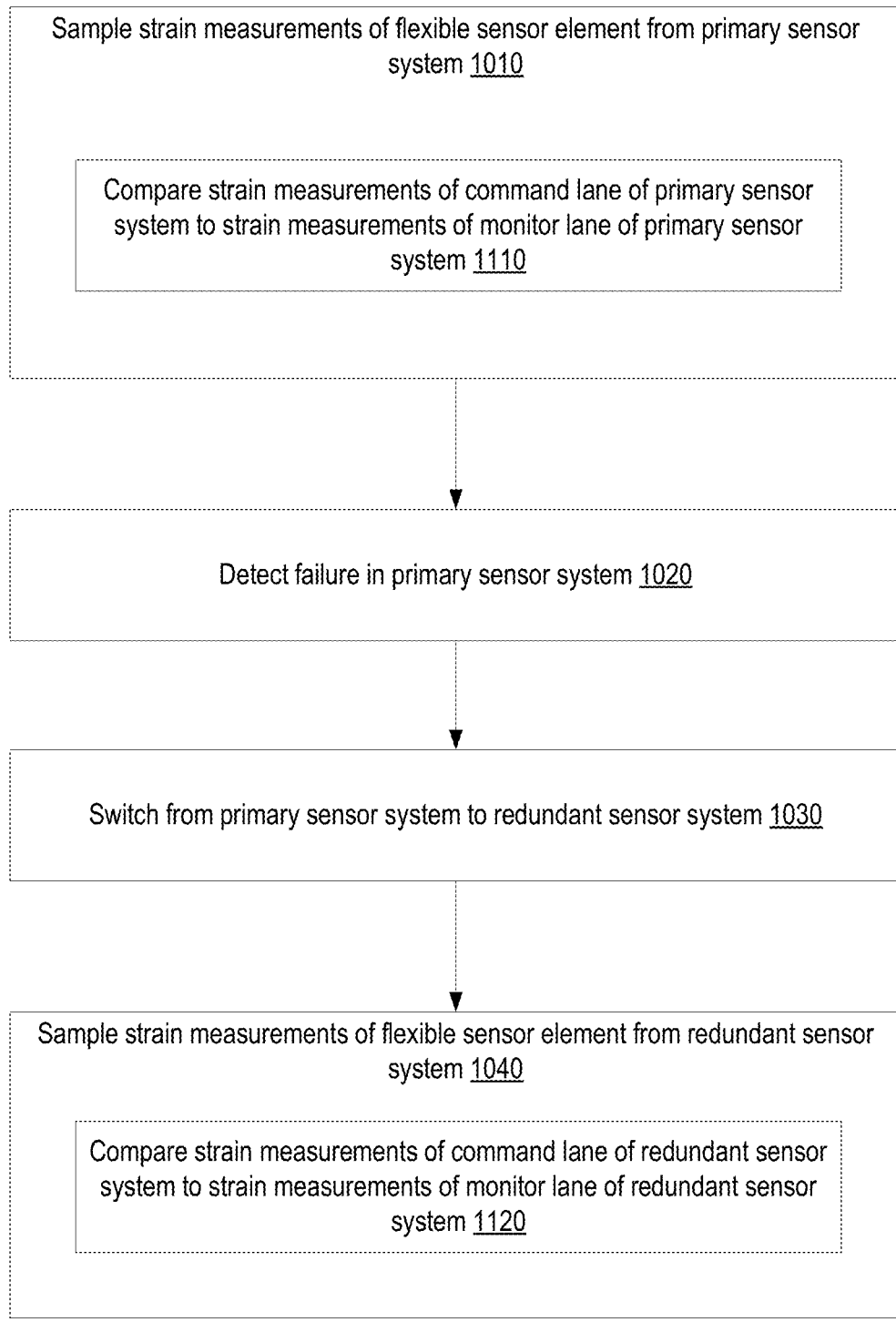
FIG. 11 sets forth a flow chart illustrating another method for a force sensor assembly with quadruple redundancy in in accordance with embodiments of the present invention.

For further explanation, FIG. 11 sets forth a flow chart illustrating an exemplary method for operating a force sensor with quadruple redundancy according to embodiments of the present invention. Like FIG. 10, the method of FIG. 11 also includes sampling (1010) strain measurements of a flexible sensing element from a primary sensor system, detecting (1020) a failure in the primary sensor system, switching (1030) from the primary sensor system to the redundant sensor system, and sampling (1040) strain measurements of the flexible sensing element from the redundant sensor system. The method of FIG. 11 is different in that sampling (1010) strain measurements of the flexible sensing element from the primary sensor system includes comparing (1110) strain measurements of a command lane of a primary sensor system to strain measurements of a monitor lane of the primary sensor system, and in that sampling (1040) strain measurements of the flexible sensing element from the redundant sensor system includes comparing (1120) strain measurements of a command lane of the redundant sensor system to strain measurements of a monitor lane of the redundant sensor system.

In the method of FIG. 11, comparing (1110) strain measurements of a command lane of a primary sensor system to strain measurements of a monitor lane of the primary sensor system may be carried out by the aircraft flight control computer (107) comparing measurements from command lane of the primary sensor system (300) to measurements from the monitor lane of the primary sensor system (300) received via the cable (913) from the command lane connector (513) and the cable (915) from the monitor lane connector (515). By comparing the measurements, it can be verified that the command lane strain measurements are consistent with the monitor lane strain measurements. Comparing (1120) strain measurements of a command lane of the redundant sensor system to strain measurements of a monitor lane of the redundant sensor system may be carried out by the aircraft flight control computer (107) comparing measurements from command lane of the redundant sensor system (400) to measurements from the monitor lane of the redundant sensor system (400) received via the cable (917) from the command lane connector (519) and the cable (919) from the monitor lane connector (521). By comparing the measurements, it can be verified that the command lane strain measurements are consistent with the monitor lane strain measurements.

In view of the explanations set forth above, readers will recognize that the benefits of a force sensor assembly with quadruple redundancy according to embodiments of the present invention include increased redundancy through increased detection channels in a flexible sensing element. The flexible sensing element contains both compression and tension fields for each pitch and roll direction. The force sensor exhibits low tangential strain, the tangential strain being strain orthogonal to the intended measured strain. The force sensor exhibits low cross-talk, cross-talk being strain in the measured in roll when only a pitch load is applied or vice versa. The strain field directionality with regard to the pitch and roll axis follows a cosine relationship, allowing for easily calculated components for both pitch and roll when the pilot applies an input with both components. The flexible sensing element contains four flexible arms extruding in Z and X direction, on which gauges can be placed in each arm to sense the directional force. With each arm being separated from one another, the design produces minimum cross talk effect (minimum X directional output when a Z directional load is applied to the flight stick). As the middle of flexible sense element is hollow, a maximum sensitivity to the directional load applied on the handle is achieved. As the above-described design of the flexible sensing element produces equivalent strain for both the top and bottom surface of each arm, this allows strain gauges to be placed on both surfaces, thus providing more detection channels for best redundancy and safety.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A force sensor apparatus comprising:
a flexible sensing element;
a primary sensor system connected to the flexible sensing element, the primary sensor system including a first lane and a second lane, wherein the first lane comprises a first pitch channel and a first roll channel, and wherein the second lane comprises a second pitch channel and a second roll channel; and
a redundant sensor system connected to the flexible sensing element, the redundant sensor system including a third lane and a fourth lane, wherein the third lane comprises a third pitch channel and a third roll channel, and wherein the fourth lane comprises a fourth pitch channel and a second fourth channel;
wherein each of the first lane, the second lane, the third lane, and the fourth lane reflect strain exhibited on the flexible sensing element; and
wherein the flexible sensing element comprises:
a first hollow tube;
a second hollow tube coaxial with the first hollow tube;
a first arm and a second arm extending from the first hollow tube in opposite directions along a first axis;
a third arm and a fourth arm extending from the first hollow tube in opposite directions from the first hollow tube along a second axis orthogonal to the first axis;
a first collar circumscribing the first hollow tube; and
a second collar circumscribing the second hollow tube,
wherein each of the first arm, the second arm, the third arm and the fourth arm connect to the first hollow tube at the first collar and to the second hollow tube at the second collar.

2. The apparatus of claim 1, wherein each of the first arm, the second arm, the third arm, and the fourth arm comprise a top segment, a bottom segment, and a middle segment that is perpendicular to the top segment and bottom segment.

3. The apparatus of claim 2, wherein joins of the top segment and the bottom segment to the middle segment allow for tension and compression of each arm.

4. The apparatus of claim 1, wherein the flexible sensing element further comprises:
a first plurality of strain gauges disposed on a surface of the top segment of the first arm;
a second plurality of strain gauges disposed on a surface of the top segment of the second arm;
a third plurality of strain gauges disposed on a surface of the top segment of the third arm;
a fourth plurality of strain gauges disposed on a surface of the top segment of the fourth arm;
a fifth plurality of strain gauges disposed on a surface of the bottom segment of the first arm;
a sixth plurality of strain gauges disposed on a surface of the bottom segment of the second arm;

a seventh plurality of strain gauges disposed on a surface of the bottom segment of the third arm; and an eighth plurality of strain gauges disposed on a surface of the bottom segment of the fourth arm.

5. The apparatus of claim 4, further comprising:

a first printed circuit board (PCB) of the primary sensor system, the first PCB comprising:
- a first integrated circuit (IC) electrically connected at least the first plurality of strain gauges;
- a second IC electrically connected to at least the second plurality of strain gauges;
- a third IC electrically connected to at least the third plurality of strain gauges; and
- a fourth IC electrically connected to at least the fourth plurality of strain gauges; and a second PCB of the redundant sensor system, the second PCB comprising:
- a fifth IC electrically connected to at least the fifth plurality of strain gauges;
- a sixth IC electrically connected to at least the sixth plurality of strain gauges;
- a seventh IC electrically connected to at least the seventh plurality of strain gauges; and
- an eighth IC electrically connected to at least the eighth plurality of strain gauges;

wherein the first IC and the third IC provide signal conditioning for a first lane output of the primary system;

wherein the second IC and the fourth IC provide signal conditioning for a second lane output of the primary system;

wherein the fifth IC and the seventh IC provide signal conditioning for a third lane output of the redundant system; and wherein the sixth IC and the eighth IC provide signal conditioning for a fourth lane output of the redundant system.

6. The apparatus of claim 5, further comprising:

a first output card connected to the first PCB via a first flexible ribbon, wherein the first output card provides output signals for the first lane and the second lane; and a second output card connected to the second PCB via a second flexible ribbon, wherein the second output card provides output signals for the third lane and the fourth lane.

7. The apparatus of claim 5, wherein the first PCB is supported above the top of the flexible sensing element, and wherein the second PCB is supported below the bottom of the flexible sensing element.

8. The apparatus of claim 7, wherein the first PCB comprises cutouts for wire bonds between the first PCB and strain gauges on the top of flexible sensing element; and wherein the second PCB comprises cutouts for wire bonds between the second PCB and strain gauges on the bottom of flexible sensing element.

9. The apparatus of claim 1, further comprising:

a base including a shaft, the flexible sensing element being disposed around the shaft;

a flange connected to an end of the shaft; and a plurality of output connectors disposed in the base, the plurality of output connector including a first output connector providing an output of the first lane, a second output connector providing an output of the second lane, a third output connector providing an output of the third lane, and a fourth output connector providing an output of the fourth lane.

10. A flexible sensing element comprising:

a first hollow tube;

a second hollow tube coaxial with the first hollow tube;

a first arm and a second arm extending from the first hollow tube in opposite directions along a first axis, a third arm and a fourth arm extending from the first hollow tube in opposite directions from the hollow tube along a second axis orthogonal to the first axis;

a first collar circumscribing the first hollow tube; and a second collar circumscribing the second hollow tube;

wherein each of the first arm, the second arm, the third arm and the fourth arm connect to the first hollow tube at the first collar and to the second hollow tube at the second collar; and wherein each of the first arm, the second arm, the third arm, and the fourth arm comprise a top segment, a bottom segment, and a middle segment that is perpendicular to the top segment and bottom segment.

11. The sensor element of claim 10, wherein joins of the top segment and the bottom segment to the middle segment allow for tension and compression of each arm.

12. The sensor element of claim 10, wherein the flexible sensing element further comprises:

a first plurality of strain gauges disposed on a surface of the top segment of the first arm;

a second plurality of strain gauges disposed on a surface of the top segment of the second arm;

a third plurality of strain gauges disposed on a surface of the top segment of the third arm;

a fourth plurality of strain gauges disposed on a surface of the top segment of the fourth arm;

a fifth plurality of strain gauges disposed on a surface of the bottom segment of the first arm;

a sixth plurality of strain gauges disposed on a surface of the bottom segment of the second arm;

a seventh plurality of strain gauges disposed on a surface of the bottom segment of the third arm; and an eighth plurality of strain gauges disposed on a surface of the bottom segment of the fourth arm.

* * * * *